Sept. 8, 1970    F. S. PASEK    3,526,947
TEMPLATE, COMBINATIONS THEREWITH, AND METHODS FOR USE THEREOF
Filed June 30, 1967    2 Sheets-Sheet 1
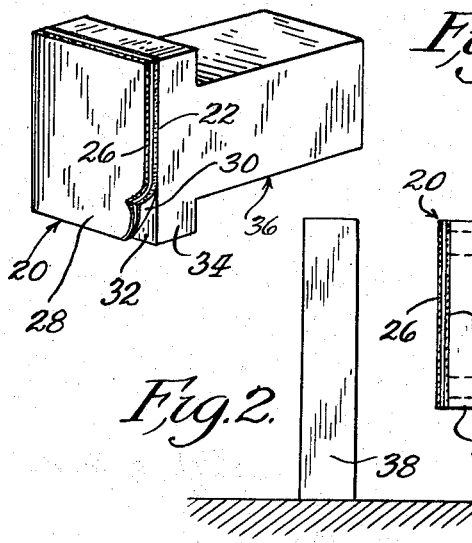
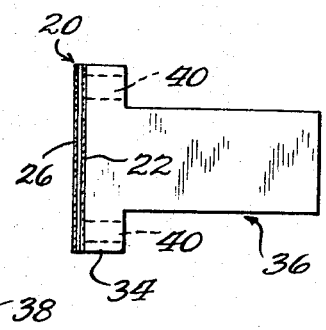
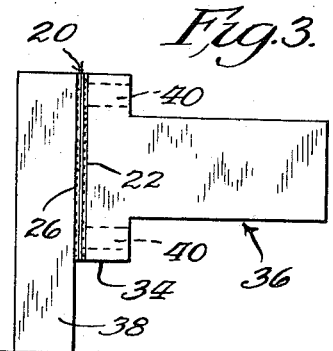
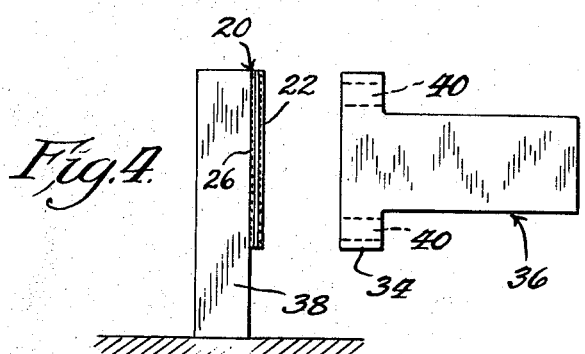
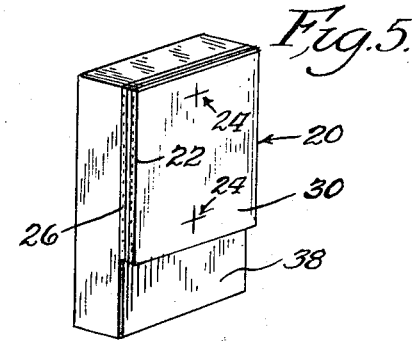
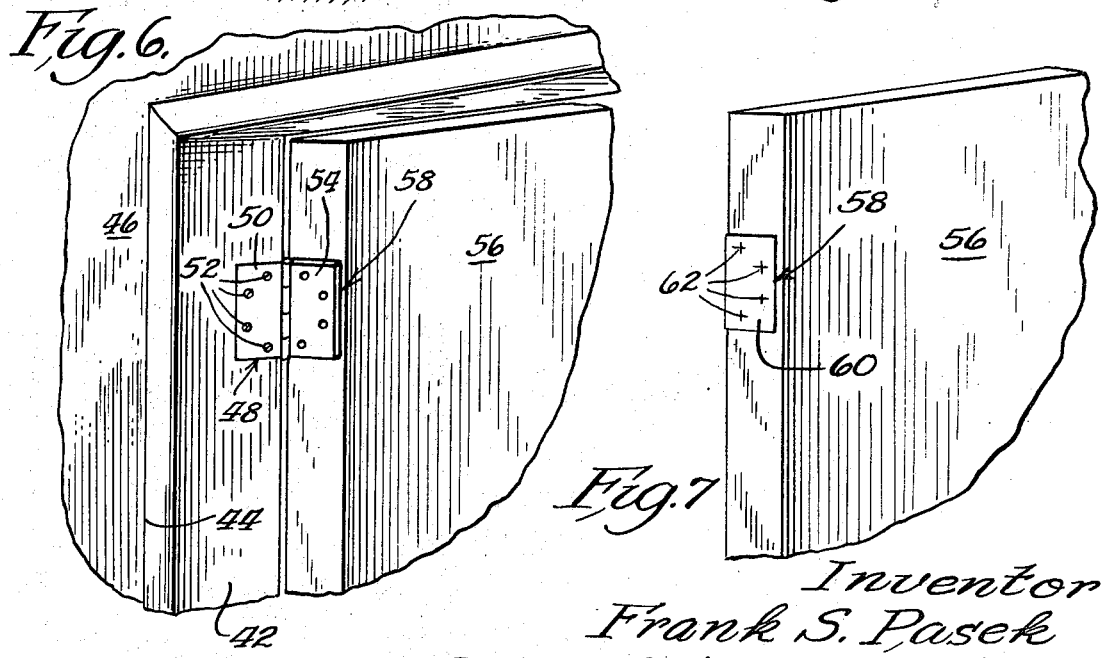
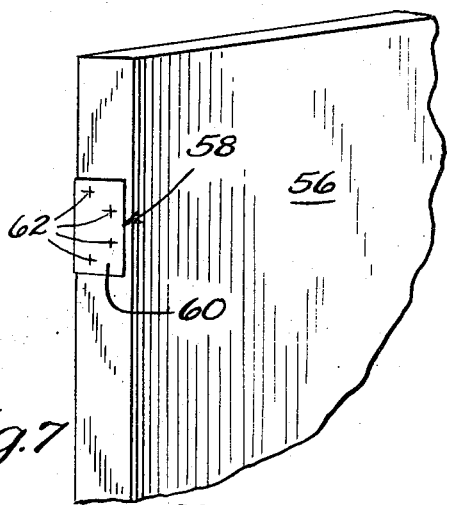
Inventor
Frank S. Pasek
By Brown, Jackson, Boettcher & Dienner
Attys.

Sept. 8, 1970  F. S. PASEK  3,526,947
TEMPLATE, COMBINATIONS THEREWITH, AND METHODS FOR USE THEREOF
Filed June 30, 1967  SHEET 2
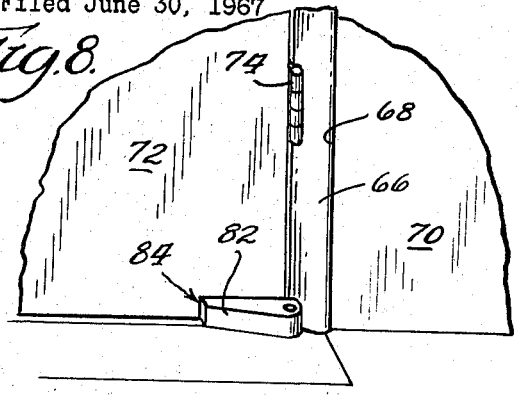
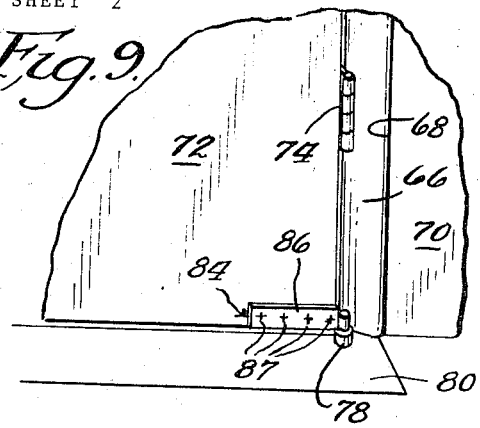
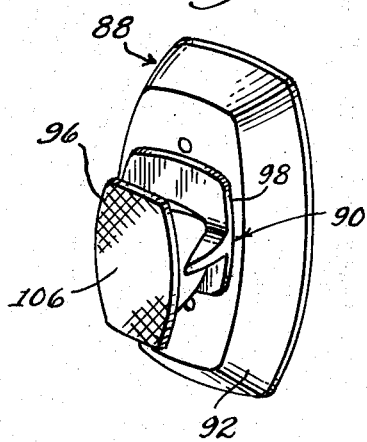
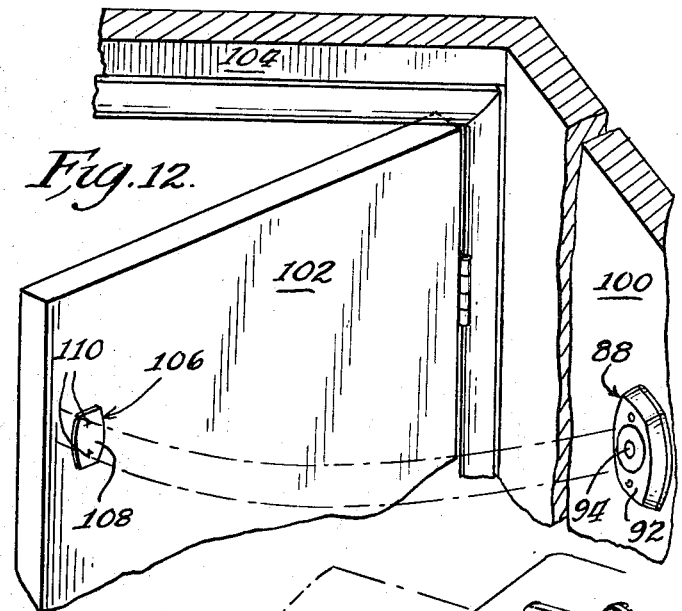
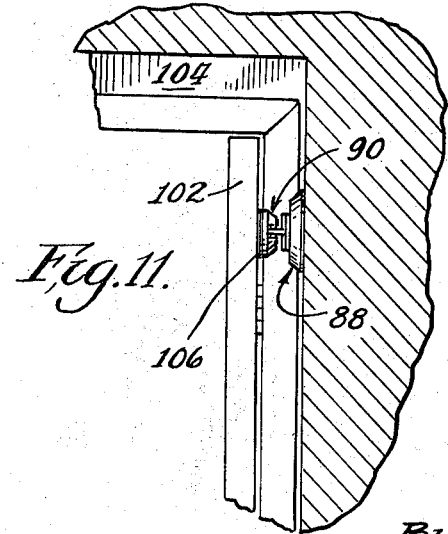
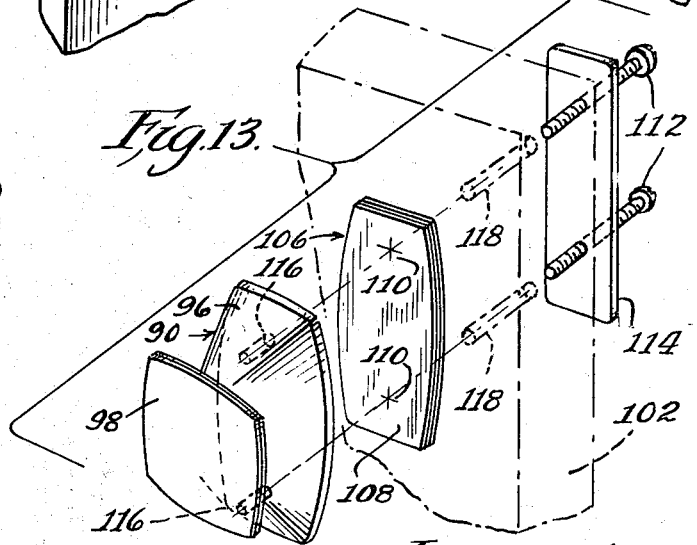
Inventor
Frank S. Pasek
By Brown, Jackson, Boettcher & Dienner
Attys.

3,526,947
TEMPLATE, COMBINATIONS THEREWITH, AND
METHODS FOR USE THEREOF
Frank S. Pasek, Westchester, Ill., assignor to Rixson Inc.,
Franklin Park, Ill., a corporation of Illinois
Filed June 30, 1967, Ser. No. 650,539
Int. Cl. B23g *17/00;* B23p *19/00;* G01b *3/14*
U.S. Cl. 29—407                                           11 Claims

ABSTRACT OF THE DISCLOSURE

A template, combinations therewith, and methods for use thereof, said template having first securing means for removably securing it on the obverse side thereof to a member and second securing means for securing it on the reverse side thereof to a support, the latter securing means having greater mechanical strength than the mechanical strength of said first securing means to cause said template to be transferable from said member to said support to which said member is adapted to be mounted.

---

This invention relates generally to templates, and relates particularly to templates designed to be transferable from members to supports to which the members are adapted to be mounted, to combinations therewith, and to methods for use thereof.

It is conventional to provide a template bearing designations of the location of holes to be drilled, cuts to be made, or other mechanical work to be performed in or on a support, for use with a member adapted to be mounted to the support. Such template conventionally is fastened to or externally held against the support in such position as has been measured or estimated to be suitable for mounting the member to the support. This expedient is generally satisfactory in the mounting of the usual household or shop hardware, such as hooks, hanger bars, and the like, but is generally unsatisfactory in a number of other cases, including the mounting of members to fixed supports wherein it is necessary or desirable that such mounting be done in accordance with the position of certain external landmarks, and especially the mounting of members to supports wherein it is necessary or desirable that such mounting be done in accordance with the position of certain external landmarks (or elements fixed to the frame of reference), but wherein the supports are movable relative to the external landmarks.

Many examples of this latter class of cases in which the conventional use of templates is generally unsatisfactory are found in the art generally relating to door hardware, with which art this inventor is familiar, but it is to be understood that similar cases are to be found throughout other fields of endeavor.

A first such case by way of example for the door hardware art relates to the mounting of a conventional two-leaf pinned door hinge. In either case, whether the leaf associated with the door frame is mounted to the door frame before the inner vertical butt edge of the door is prepared to receive the other leaf, or whether the leaf associated with the door is mounted to the door before the door frame is prepared to receive the other leaf, templates as conventionally used are of little or no assistance to the installer who is faced with the task of mounting the hinge so as to hand the door in proper relation to the door frame and with proper drop from the lower horizontal butt edge of the door to the floor or kick plate beneath.

A second such case by way of example from the door hardware art relates to the mounting of a door closer mechanism of the type which comprises a mandrel fixedly mounted coaxial with the hinge line on the pull side of a conventional push-pull framed door, either directed downwardly from the top of the door or preferably directed upwardly from the bottom of the door (to allow the mandrel to be mounted to the floor such that the associated mechanism may be concealed in the floor) and an arm pivotally mounted to the mandrel and associated with biasing means (such as spring means loaded by pivoting of the lever) for tending to close the door to which the arm is flush-mounted (conventionally by screws). In mounting of such a door closer mechanism, it is conventional to fixedly mount the mandrel before preparing the pull side of the door to receive the arm. At this point, templates as conventionally used are of little or no assistance to the installer who is faced with the task of flush-mounting the arm to the door in such precise position that neither the door nor the door closer mechanism causes the other to bind.

A third such case by way of example from the door hardware art relates to the mounting of a door release mechanism of the type, often used in conjunction with a door closer mechanism of the aforementioned type, comprising a magnet, preferably a remotely actuatable electromagnet. The magnet is fixedly mounted to a support which, in the case of a door hung adjacent to a wall corner, is typically a wall in the path of a pull side of the door. An armature is fixedly mounted to such pull side of the door in such position as to be disposed to operatively engage the magnet when the door has been opened sufficiently to such pull side.

In view of the foregoing, it is a first object of this invention to provide a template which is generally of useful advantage in a number of cases in which templates as conventionally used are of little or no advantage, including the cases from the door hardware art hereinbefore discussed.

It is a second object of this invention to provide a template which is transferable from a member to a support to which the member is adapted to be mounted.

It is a third object of this invention to provide either for use with or for combination with a member adapted to be mounted to a support, a template having first securing means for removably securing it on the obverse side thereof to the member and second securing means for securing it on the reverse side thereof to the support upon engagement of the second securing means with the support, the second securing means having greater mechanical strength than the mechanical strength of the first securing means. Thus, when the member, while the template is secured thereto on the obverse side, is moved to a position at which the second securing means is engaged with the support, and when thereafter the member is separated from the support, the template will be removed from the member and will remain secured to the support.

It is contemplated that in a number of embodiments of this invention as above characterized, one or both of the first and second securing means may comprise adhesive means. When both comprise adhesive means, the specified relative mechanical strengths may be provided by different expedients, for example, providing a relatively weak removably adhesive surface (such as, for example, one formed of soap, wax, paraffin, gum elastic, or the like) on the obverse side of the template and providing a relatively strong adhesive surface on the reverse side thereof; or providing a relatively small total adhesive surface on the obverse side of the template and providing by means of similarly strong adhesive a relatively large total adhesive surface on the reverse side thereof. In all such cases, the adhesive used on the obverse side of the template must be removably adhesive, in order that the contemplated template transfer may be effected. Likewise, preferably the adhesive used on the reverse side of the template is removably adhesive, in order that the template may be removed after its function has been fulfilled, if such removal is desired.

It is suggested that a removable protective cover be used to protect the adhesive means on the reverse side of the template, this protective cover to be removed prior to the use of the template. Such covers are used conventionally with adhesive-backed shelf paper and on many other adhesive-backed items.

Where printed designations are provided on the obverse side of the template, the securing means of whatever type provided thereon should not obscure the designations, such usually not being a problem where adhesive means are used on the obverse side of the template. In suitable applications, the outline of the template itself or of cut-outs therein may serve to locate the work to be done, in place of or in aid of printed designations. Preferably, the templates of this invention have a perimeter corresponding to the perimeter of the members to which they are to be attached by their obverse sides.

It is a fourth object of this invention to provide methods for positioning a member relative to a support, by means of a template as hereinbefore characterized.

It is a fifth object of this invention to provide methods for positioning a first member relative to a support in accordance with the relative position of a second member. By way of example of the applicability of these methods, they may be applied to the cases from the door hardware art hereinbefore discussed.

It is then a more particular sixth object of this invention to provide such methods to the mounting of a door release mechanism comprising a magnet and an armature as discussed.

These and other objects, features, and advantages of this invention should be apparent from the detailed description hereinafter set forth.

In order to teach those skilled in the art to which this invention pertains to practice this invention, there shall be described hereinafter in conjunction with the annexed drawings, a preferred embodiment thereof and several examples of its use.

FIG. 1 is a perspective view showing a template, formed in accordance with the principles of this invention secured by means of removably adhesive means on its obverse side to a member (of a general sort). In order to illustrate the adhesive means provided on the obverse and reverse sides of the template, the thickness of the illustrated template is exaggerated somewhat in this and related views. In this view, one corner of the template is peeled back to expose certain details.

FIG. 2 is an elevation view related to FIG. 1, showing the member and template, and a support to which the member is adapted to be mounted by means of screws (not shown) engaging bores in the member (as indicated by dashed lines). These elements are shown just prior to movement of the member to the position shown in FIG. 3.

FIG. 3 is an elevational view, related to FIG. 2, showing the member and template in a position relative to the support at which adhesive means provided on the reverse side of the template engages the support and secures the template to the support.

FIG. 4 is an elevation view, related to FIG. 3, showing the member separated from the support, with the template having been removed from the member and remaining secured to the support.

FIG. 5 is a perspective view, related to FIG. 4, showing the template secured to the support with its exposed obverse side bearing printed designations visible through the removably adhesive means provided thereon for purposes of locating the positions of bores to be drilled in the support to accommodate the mounting screws associated with the member.

FIG. 6 is a fragmentary perspective view showing portions of a door and an associated door frame. One leaf of a two-leaf pinned hinge has been mounted by means of screws to the door frame. A template formed in accordance with this invention is indicated as secured on its obverse side to the overlead side of the other hinge leaf and on its reverse side to the inner vertical butt edge of the door. This view relates to an application of this invention to the first case from the door hardware art hereinbefore discussed.

FIG. 7 is a fragmentary perspective view, related to FIG. 6, showing the template transferred from the hinge leaf to the door, bearing designations for purposes of locating the positions of holes to be drilled in the door to accommodate the mounting screws (not shown) associated with such other hinge leaf.

FIG. 8 is a fragmentary perspective view showing portions of an associated door, door frame, wall and floor. An arm, pivotally mounted to a mandrel which is fixedly mounted to the floor coaxial with the hinge line on the pull side of the door, is associated with a template formed in accordance with the principles of this invention, which is indicated as secured on its obverse side to the face of the arm which is adapted to be flush-mounted to the door by means of machine screws (not shown) leading in from the opposite side of the door and on its reverse side to the pull side of the door. This view relates to an application of this invention to the second case from the door hardware art hereinbefore discussed.

FIG. 9 is a fragmentary perspective view, related to FIG. 8, showing the template transferred from the arm to the door, bearing designations for purposes of locating the positions of holes to be drilled in the door to accommodate the mounting screws associated with the arm. The mandrel is shown fixedly mounted to the floor, with the arm removed.

FIG. 10 is a perspective view of the electromagnet of a door release mechanism and the associated armature operatively engaging the electromagnet. A template, formed in accordance with this invention, is indicated as secured on its obverse side to the mounting portion of the armature. This view relates to an application of this invention to the third case from the door hardware art hereinbefore discussed.

FIG. 11 is a fragmentary elevation view of the electromagnet of FIG. 10 mounted to a wall in the path of the pull side of the door, with the armature magnetically supported by the electromagnet and, by its reverse side to the pull side of the door which has been moved being engaged with a position at which the pull side of the door engages the adhesive surface on the reverse side of the template.

FIG. 12 is a fragmentary perspective view, related to FIG. 11, showing the template transferred to the door, bearing designations for the purposes of locating the positions of holes to be drilled in the door to accommodate the mounting screws (see FIG. 13) associated with the mounting portion of the armature. Imaginary arcs indicate the manner in which the template is placed in accordance with the position of the electromagnet.

FIG. 13 is a fragmentary exploded view, related to FIG. 11, showing the manner in which the designations provided on the obverse side of the template locate the positions of the mounting screws associated with the mounting portion of the armature, such mounting screws being adapted to be leading in, against a washer plate, from the push side of the door to suitable threaded sockets formed in the mounting portion of the armature. The dashed lines are not meant to indicate the top horizontal and outer vertical butt edges of the door of FIG. 12, but rather are meant to suggest the thickness of the door.

Referring first to FIGS. 1-5, there is shown a template 20, formed as a wafer or sheet, formed of paper, mild cardboard, metal foil, or the like, having an obverse side 22 bearing printed or otherwise suitably provided designations 24 and a reverse side 26. A relatively strong adhesive surface 28 is provided on the reverse side 26 of template 20 by means of a coating of a relatively strong adhesive material applied in any suitable manner to the reverse side 26. A removably adhesive material selected from the class of adhesive materials conventionally provided on masking tapes is suggested for this purpose. A relatively weak removably adhesive surface 30 is provided on the obverse side 22 of template 20 by means of a coating of a relatively weak removably adhesive material applied in any suitable manner to the obverse side 22. The relatively weak removably adhesive material which is used is selected so as not to obscure the designations 24 provided on the obverse side 22 of the template 20. A conventional wax is suggested for these purposes.

As shown in FIG. 1, template 20 is removably secured on its obverse side 22 by means of the relatively weak removably adhesive surface 30 provided thereon to the mounting surface, or operating face, 32 of the mounting portion 34 of member 36.

FIGS. 2–4 show the general sequence of steps involved in the use of template 20. As shown in these figures, support 38 is fixedly mounted in a fixed frame of reference relative to member 36 which is adapted to be mounted to the support 38 by means of screws (not shown) engaging bores 40 formed through the mounting portion 34 of member 36.

The member 36, having the template 20 removably secured thereto as described, is moved from a position apart from the support 38, as suggested in FIG. 2, to the position shown in FIG. 3 at which the relatively strong adhesive surface 28 provided on the reverse side 26 of the template 20 engages the support 38 and secures the template 20 to the support 38.

Thereafter, when the member 36 is separated from the support 38, as suggested in FIG. 4, because the mechanical strength of the relatively strong adhesive surface 28 is greater than the mechanical strength of the relatively weak removably adhesive surface 30, the template 20 will be removed from member 36 and will remain secured to the support 38. It is of no significance if after this separation a portion of the adhesive means comprising the relatively weak removably adhesive surface 30 remains on the mounting portion 34 of member 36; and for simplicity this possible effect is not shown.

In FIG. 5, related to FIG. 4, the support 38 and the adhered template 20 are shown, the obverse side 22 of the template 20 bearing the cross-shaped designations 24 of the locations of holes to be drilled in the support 38 to accommodate the screws (not shown) for mounting member 36 in the support 38 as described. In this way the member 36 may be mounted relative to the support 38 in accordance with the position of certain external landmarks (such as the base of the support 38).

The steps involved in methods for positioning a member relative to a support should be apparent at this point. In terms of the description above referring to FIGS. 1–5, one such method may comprise, the template 20 being secured on its obverse side 22 to the member 36 (FIGS. 1 and 2), the steps of relatively moving the member 36 and the support 38 to a position (FIG. 3) at which the relatively strong adhesive surface 28 engages the support 38 thereby securing the template 20 on its reverse side 26 to the support 38, and then relatively separating the member 36 and the support 38 (FIG. 4) thereby leaving the template 20 secured on its reverse side 26 to the support 38 (FIG. 5).

Thus, the fulfillment of the second, third, and fourth objects of this invention should be apparent from the description above referring to FIGS. 1–5.

In related applications of this invention, a template formed in accordance with the principles of this invention may be used to locate the sites of jigsawing, planing, sanding, grinding, or other mechanical working which may be aided by the use of a properly placed template.

Furthermore, it should be clear that this first example, described in conjunction with FIGS. 1–5, is to be understood generally and is not to be limited to any specific types of members and supports.

In the application of this invention to the first case from the door hardware art hereinbefore discussed, referring now to FIGS. 6 and 7, there is shown in FIG. 6 a door frame 42 mounted within a doorway 44 in a wall 46. A conventional two-leaf pinned hinge 48 is shown, having a first leaf 50 mounted to the door frame by means of screws 52 and a second leaf 54 adapted to be mounted to the inner vertical butt edge of door 56. In FIG. 6, a template, indicated generally at 58 in FIG. 6, formed in accordance with the principles of this invention, is shown secured by a relatively weak, removably adhesive surface on its obverse side to the overleaf side of the second leaf 54 of the hinge 48 and secured by a relatively strong adhesive surface on its reverse side to the inner vertical butt edge of the door 56 which temporarily has been held on blocks or otherwise, in proper relation to the door frame 42 and with proper drop from the lower horizontal butt edge of the door 56 to the floor or kick plate beneath (not shown).

FIG. 7 shows the door 56 removed from the door frame 42, with the template 58 transferred thereto. The obverse side 60 of the template 58 bears cross-shaped designations 62 of the locations of holes to be drilled in the inner vertical butt edge of the door 56 to accommodate the screws (not shown—similar to screws 52) for mounting the second leaf 54 of the hinge 48 to the door 56, whereby the second leaf 54 of the hinge 48 may be positioned when mounted thereto relative to the door 56 in accordance with the relative position of the first leaf 52 of the hinge 48, the door frame 42, the floor or kick plate beneath (not shown), and other external landmarks. In this case, the door 56, which serves as the support to which hinge leaf member 54 is mounted, is movable relative to these external landmarks. Marking around the template's perimeter also shows where the door should be recessed for the hinge leaf 54.

The steps involved in methods for positioning a first member relative to a support in accordance with the relative position of a second member should be apparent at this point. In terms of the above description referring to FIGS. 6 and 7, one such method may comprise, the template 58 first being secured on its obverse side 60 to the first member (second leaf of the hinge 48) 54, the steps of relatively moving the first member 54 and the support (door) 56 to a position (FIG. 6) in accordance with the relative position of the second member (first leaf of the hinge 48) 52 at which position the relatively strong adhesive surface engages the support 56, thereby securing the template 58 to the support 56, and then relatively separating the first member 54 and the support 56 (FIG. 7), thereby leaving the template 58 secured on its reverse side to the support 56.

In application of this invention to the second case from the door hardware art hereinbefore discussed, referring now to FIGS. 8 and 9, there is shown a door frame 66 mounted within a doorway 68 in a wall 70. A conventional push-pull door 72 is hung by means of hinges, including the hinge 74, within the door frame 66. As shown, the pull side of the door 72 faces the viewer.

A door closer mechanism comprises a mandrel 78 (see FIG. 9) fixedly mounted by any suitable expedient in the floor or to a kick plate or apron 80 disposed beneath the door 72, coaxial with the hinge line on the pull side of the door 72. An arm 82 having a flat face (not visible in FIGS. 8 and 9) is removably pivotally mounted to the mandrel. The flat face of the arm is adapted to be flush-mounted to the pull side of the door 72 by screws (not shown) leading in from the push side of the door. The floor or a kick plate or apron 80 conceals the door closer mechanism associated with the mandrel 70, including biasing means (such as spring means loaded by pivoting of the lever) for tending to close the door 72 to which the arm 82 is to be flush-mounted.

In FIG. 8, a template, indicated generally at 84, formed in accordance with the principles of this invention, is secured by a relatively weak, removably adhesive surface on its obverse side to the flat face of the arm 82 and secured by a relatively strong adhesive surface on its reverse side to the pull side of the door 72, which temporarily has been held closed into the door frame 66.

FIG. 9 shows the arm 82 removed from the mandrel 78, with the template 84 transferred to the pull side of the door 72. The obverse side 86 of the template 84 bears cross-shaped designations 86 of the locations of holes to be drilled through the door to accommodate the screws (not shown) for mounting the arm 82 to the door 72 after the arm 82 has been remounted to the mandrel, whereby the arm 82 may be positioned when mounted thereto relative to the door 72 in accordance with the relative position of the mandrel 78, the door frame 66, the kick plate or apron 80, and other external landmarks. In this case, the door 72, which serves as the support to which lever 82 is mounted, is movable relative to these external landmarks.

In terms of the above description referring to FIGS. 8 and 9, it should be apparent that a method for positioning a first member relative to a support in accordance with the relative position of a second member may comprise the template 84 being secured on its obverse side 86 to the first member (arm) 82, the steps of relatively moving the first member 82 and the support (door) 72 to a position (FIG. 8) in accordance with the relative position of the second member (mandrel) 78, at which position the relatively strong adhesive surface engages the support 72 thereby securing the template 84 to the support 72, and then relatively separating the first member 82 and the support 72 (FIG. 9), thereby leaving the template 84 secured on its reverse side to the support 72.

Thus, the fulfillment of the fifth object of this invention should be apparent from the above descriptions referring to FIGS. 6 and 7 and FIGS. 8 and 9.

In application of this invention to the third case from the door hardware art hereinbefore discussed, referring now to FIGS. 10–13, there is shown in FIG. 10 a remotely actuatable electromagnet 88 and an armature 90 in operative engagement. Details of their structure and function hereinafter given will be limited to those needed for an understanding of this invention as applied to the mounting of such combination of devices.

Further details of the electromagnet 88 are visible in FIG. 12. It comprises a housing 92 and a core 94, as shown.

Armature 90 comprises a flat-faced mounting portion 96 and a head 98 pivotally mounted to the mounting portion 96 for limited pivotal rotation about an axis which is disposed vertically as armature 90 is viewed in FIG. 10.

As seen in FIGS. 11 and 12, the electromagnet 88 is mounted to a wall 100 in the path of a pull side of a door 102 hung adjacent to a wall corner formed by the wall 100 and a wall 104 generally perpendicular to the wall 100.

In FIG. 11, a template, indicated generally at 106, formed in accordance with the principles of this invention, is secured by a relatively weak, removably adhesive surface on its obverse side to the flat face of the mounting portion 96 of the armature 90 and secured by a relatively strong adhesive surface on its reverse side to the pull side of the door 102 which has been opened to the position shown while the armature 90 has been held by energization of the electromagnet 88 or otherwise in the operative engagement shown in FIG. 10. The head 98 of the armature 90 is pivoted relative to mounting portion 96 thereof to allow the flat face thereof (with the template 106 thereon) to be flush with the pull side of the door 102.

FIG. 12 shows the door 102 opened from its position in FIG. 11, with the armature 90 removed, and with the template 106 transferred to the pull side of the door 102. The obverse side 108 of the template 106 bears cross-shaped designations 110 of the locations of holes to be drilled through the door 102 to accommodate the screws 112 (see FIG. 13) for mounting the armature 90 to the door 102, whereby the armature 90 may be positioned when mounted thereto relative to the door 102 in accordance with the relative position of the electromagnet 88 and other external landmarks. In this case, the door 102 which serves as the support to which armature 90 is mounted, is movable relative to these external landmarks.

In FIG. 13, the dashed lines suggest the thickness of the door 102 to which the armature 90 is to be mounted by means of the screws 112 bearing against a washer plate 114 and leading in from the push side of the door 102 to suitable sockets or bores 116 formed in the mounting portion of the armature 90. The designations 110 on the obverse side 108 of the template 106 locate the holes (see 118) to be drilled in the door 102 to accommodate the screws 112. If the reverse side of the template 106 is adapted to be removably secured to the door 102, the template 106 may be removed from the door 102 after the holes have been drilled and before the armature 88 is mounted. However, since the perimeter of the template is the same as the perimeter of mounting portion 96 of the armature 90 and since the template is actually quite thin, it will not be readily detected if left in place with the armature secured over it.

In terms of the above description referring to FIGS. 10–13, it should be apparent that a method for positioning an armature relative to a pull side of a door in accordance with the relative position of a magnet fixedly mounted in the path of such pull side of the door may comprise the template 106 being secured on its obverse side 108 to the armature 90 and the armature 90 being held temporarily against the magnet (electromagnet) 88, the steps of moving the door 102 to a position (FIG. 11) at which the relatively strong adhesive surface engages the pull side of the door 102 thereby securing the template 106 on the reverse side to the pull side of the door 102, and then, the armature 90 remaining held temporarily against the magnet 88, removing the door 102 from said position (FIG. 12) thereby leaving the template 106 secured on its reverse side to such pull side of the door 102.

Thus, the fulfillment of the sixth object of this invention should be apparent from the above description referring to FIGS. 10–13.

While it is preferred to use adhesives of different strengths on opposite sides of the template, it is possible to use adhesive of the same strength but in differing amounts. It should be noted that non-adhesive means may be used in place of adhesive means on one or both of the obverse and reverse sides of the template used in each of the above described examples (FIGS. 1–5; FIGS. 6 and 7; FIGS. 8 and 9; FIGS. 10–13) as long as the mechanical strength of the securing means associated with the reverse side of the template is greater than the securing means associated with the obverse side of the template. Furthermore, in each of these examples cut-outs in the template itself may be used in place of or in aid of the cross-shaped designations and, as earlier mentioned, a removable protective cover may be used to protect adhesive means on the reverse side of the template, this protective cover to be removed prior to use of the template.

Other modifications and improvements in the templates, combinations therewith, and methods of use thereof to which this invention relates particularly will be suggested by this disclosure to those skilled in the art. Furthermore, this invention is not to be considered as limited to the herein described examples or to the door hardware art. Rather, this invention should be considered as defined by the following claims.

I claim:

1. A template for use with a first member which is to be mounted to a support and in a certain relationship to a second member, the template having an obverse side and a reverse side, said template having first adhesive securing means for removably securing the template on said obverse side to said first member and second adhesive securing means for securing the template on said reverse side to said support upon engagement of said second securing means with said support, said second securing means having greater securing strength than the securing strength of said first securing means, whereby when said first member, while said template is secured thereto on said obverse side, is brought by relative movement between said support and first member to a position at which said second securing means is engaged with said support while the first member is disposed in said certain relationship to said second member, and when thereafter said first member is separated from said support, said template will be removed from said first member and will remain secured to said support to establish where the first member must be mounted to said support to be in said certain relationship to said second member.

2. The template of claim 1 wherein said second securing means comprises removably adhesive means on said reverse side.

3. A template for use with a first member adapted to be mounted to a support and in a certain relationship to a second member, the template having an obverse side and a reverse side with indicia for application of fastening means on said obverse side, said template having first adhesive securing means for removably securing the template on said obverse side to said first member and second adhesive securing means for securing the template on said reverse side to said support upon engagement of said second securing means with said support, said second securing means having greater securing strength than said first securing means, whereby when said first member, while said template is secured thereto on said obverse side, is brought by relative movement between said support and said first member to a position at which said second securing means is engaged with said support, and when thereafter said first member is separated from said support, said template will be removed from said first member and will remain secured to said support and said indicia will then be displayed to show where fastening means for the first member is to be applied so that said first member must be mounted to said support to be in said certain relationship to said second member.

4. The template of claim 3 wherein said second adhesive means is removably adhesive.

5. A method for assuring the accurate connection to a support of a first member, which first member when connected must also be in a certain relationship with a second member, by means of a template having an obverse side and a reverse side and having first adhesive securing means on said obverse side for operatively associating the template with said first member and second adhesive securing means on said reverse side for operatively associating the template with said support, said second securing means having greater securing strength than said first securing means, said method comprising, securing said template by said obverse side with said first member; relatively moving said first member and said support to a position at which said second securing means engages said support while said first member is disposed in said certain relationship to said second member, thereby securing said template on its reverse side to said support; and then relatively separating said first member and said support thereby leaving said template secured to said support to establish the accurate position for connecting said first member to said support.

6. A method for assuring the accurate connection to a support, which has an established path of movement, of a first member having a mounting surface which has at least one bore for receiving a fastener, which first member when connected must also be in a certain relationship with a second member, by means of a template having an obverse side with bore indicating indicia, and a reverse side, and having first adhesive securing means for securing it on said obverse side and second adhesive securing means for securing it on said reverse side, said second securing means having greater securing strength than the securing strength of said first securing means, said method comprising securing said template on said obverse side to said first member—with the bore indicating indicia aligned with the bore of the first member, relatively moving said first member and said movable support to a position related to the position of said second member at which position said second securing means engages said support thereby securing said template on said reverse side to said support, and then relatively separating said first member and said movable support thereby leaving said template secured on said reverse side to said support and revealing the bore indicating indicia on said exposed obverse side to establish the accurate position for connecting said first member to said support by its mounting surface.

7. A method according to claim 6 wherein the first securing means is a relatively weak adhesive and the second securing means is a relatively strong adhesive to said first member, the steps of relatively moving said first member and said support to a position in accordance with the relative position of said second member at which position said relatively strong adhesive surface engages said support thereby securing said template to said support, and then relatively separating said first member and said support thereby leaving said template secured on said reverse side to said support.

8. A method for positioning an armature having two faces relative to one side of a door in accordance with the relative position of a magnet fixedly mounted in the path of said one side of said door, by means of a template having an obverse side and a reverse side and having first adhesive securing means for securing it on said obverse side and second securing means for adhesive securing it on said reverse side, said second securing means having greater securing strength than the securing strength of said first securing means, said method comprising, securing said template on said obverse side to one face of said armature positioning the other face of said armature against said magnet so as to be held thereby in normal registering relation, moving said door to a position at which said second securing means engages said one side of said door thereby securing said template by said second securing means on said reverse side to said one side of said door, and then, while said armature remains held temporarily against said magnet, removing said door from said position thereby leaving said template secured by the second securing means on said reverse side to said one side of said door.

9. A method of positioning an armature having two faces relative to one side of a door in accordance with the position of magnet fixedly mounted in the path of said one side of said door, by means of a template having an obverse side provided with a relatively weak removably adhesive surface and a reverse side provided with a relatively strong adhesive surface, said method comprising, securing said template on said obverse side to one face of said armature and positioning the other face of said armature against said magnet so as to be held thereby in normal registering relation, moving said door to a position at which said relatively strong adhesive surface engages said one side of said door thereby securing said template by said relatively strong adhesive surface on said reverse side to said one side of said door, and then, while said armature remains held temporarily against said magnet, removing said door from said position thereby leaving said template secured by said relatively strong adhesive surface on said reverse side to said one side of said door.

10. A template for use with a support mounted for movement, a member having a mounting surface and having at least one bore to receive fastening means for fastening said member to said support at said surface, the template conforming in outline to said mounting surface of said member and having an obverse side and a reverse side, said template having first adhesive securing means for removably securing it on said obverse side to said member and second adhesive securing means for securing it on said reverse side to said support upon engagement of said second securing means with said movable support, said template having indicia on said obverse side of the template visible through said first securing means and aligned with said bore, said second securing means having greater securing strength than the securing strength of said first securing means, whereby, when said member, while said template is secured thereto on said obverse side, is brought by relative movement between said support and member to a position at which said second securing means is engaged with said movable support, and when thereafter said member is separated from said support, said template will be removed from said member and will remain secured to said support and will display said indicia.

11. A method of assuring the accurate connection to a support, which has an established path of movement, of a first member having a mounting surface, which member when connected must also be in a certain relationship with a second member, said first member having bores to receive fastening means for fastening said first member to said support by said fastening means, said method providing a flat template having an outline conforming to said mounting surface of said first member and indicia matching the position of the bores in said first member, said template having an obverse side and reverse side and having first adhesive securing means on said obverse side and second adhesive securing means on said reverse side, said second securing means having greater securing strength than said first securing means, and with said indicia being visible through said first securing means; the method comprising, securing, said template by its obverse side to said first member by said first securing means so that its configuration conforms to that of said mounting surface and so that said indicia are aligned with said bores; relatively moving said first member and said support through said established path of movement to a position at which said second securing means engages said support while said first member is disposed in said certain relationship to said second member, thereby securing said template on its reverse side to said support; and then relatively separating said member and said support thereby leaving said template secured to said support to establish the position for accurate connection of said first member to said movable support by the revealed position of the indicia.

References Cited

UNITED STATES PATENTS 3,105,985    10/1963    Reid et al.            12—142

FOREIGN PATENTS 929,874    1/1955    Germany.

WILLIAM D. MARTIN, JR., Primary Examiner

S. L. STEPHAN, Assistant Examiner

U.S. Cl. X.R.

29—200; 33—174, 189

PO-1050
(5/69)

UNITED STATES PATENT OFFICE
CERTIFICATE OF CORRECTION

Patent No. 3,526,947          Dated September 8, 1970

Inventor(s) FRANK S. PASEK

It is certified that error appears in the above-identified patent and that said Letters Patent are hereby corrected as shown below:

Column 10, lines 24-32 -(Claim 7 lines 3-11)
Delete "to said first member, the steps of relatively moving said first member and said support to a position in accordance with the relative position of said second member at which position said relatively strong adhesive surface engages said support thereby securing said template to said support, and then relatively separating said first member and said support thereby leaving said template secured on said reverse side to said support"

SIGNED AND
SEALED
NOV 17 1970

(SEAL)
Attest:

Edward M. Fletcher, Jr.
Attesting Officer

WILLIAM E. SCHUYLER, JR.
Commissioner of Patents